United States Patent [19]

Young

[11] Patent Number: 4,492,346

[45] Date of Patent: Jan. 8, 1985

[54] POSITIVE RETRACTING MECHANICAL EXPANSIBLE SHAFT

[75] Inventor: Lawrence C. Young, So. Easton, Mass.

[73] Assignee: Double E Company Inc., Brockton, Mass.

[21] Appl. No.: 470,143

[22] Filed: Feb. 28, 1983

[51] Int. Cl.³ .................. B65H 75/24; B65H 54/54
[52] U.S. Cl. .................. 242/72.1; 242/46.4
[58] Field of Search .......... 242/72.1, 72 R, 68.2, 242/46.2, 46.3, 46.4; 279/2 R, 2 A

[56] References Cited

U.S. PATENT DOCUMENTS

| 2,345,246 | 3/1944 | Elka | 242/72.1 |
| 2,718,103 | 9/1955 | Wagner | 242/72.1 X |
| 3,331,565 | 7/1967 | Gerritts | 242/72.1 |
| 3,645,465 | 2/1972 | Peery | 242/72.1 |
| 3,833,179 | 9/1974 | Maurer | 242/46.4 |
| 4,105,172 | 8/1978 | Petros | 242/72.1 X |
| 4,244,534 | 1/1981 | Rennebaum et al. | 242/72.1 |
| 4,254,920 | 3/1981 | Peterson | 242/72.1 |

FOREIGN PATENT DOCUMENTS 1100867 3/1961 Fed. Rep. of Germany ..... 242/46.4

Primary Examiner—Stanley N. Gilreath

[57] ABSTRACT

An expansible shaft in which a screw that is rotationally and axially movable relative to the housing is rotatably connected to the operating rod so that clockwise screw rotation moves the rod axially in one direction and counterclockwise screw rotation moves the rod axially in the opposite direction.

12 Claims, 10 Drawing Figures

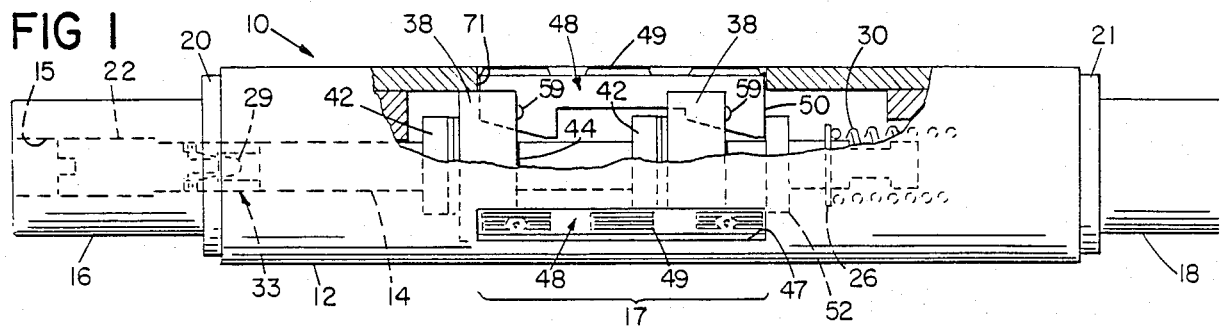
FIG 1
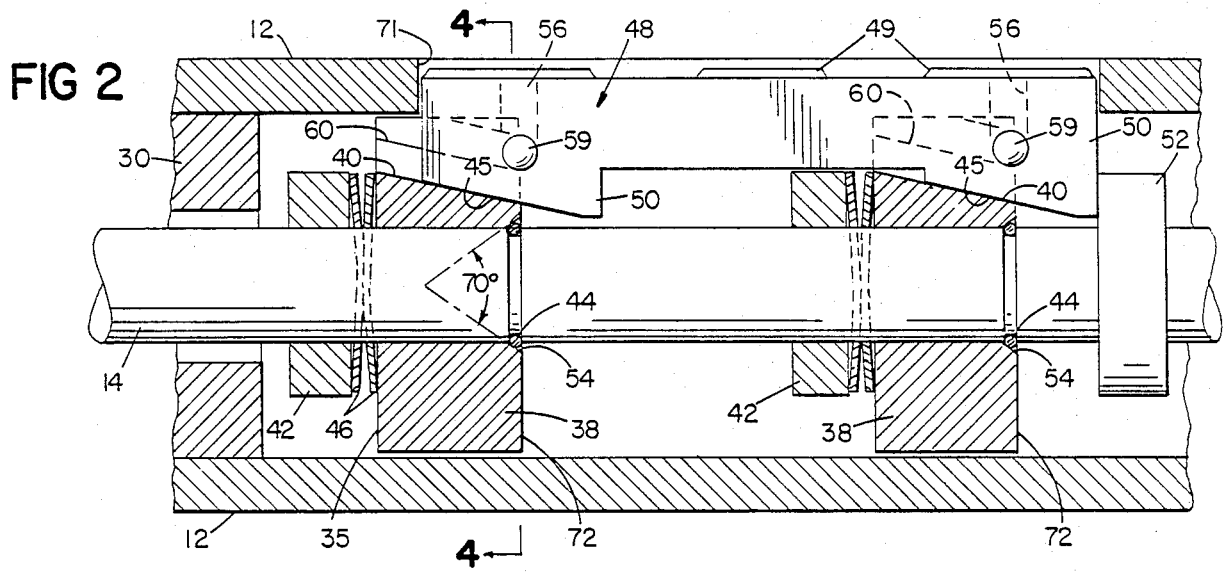
FIG 2
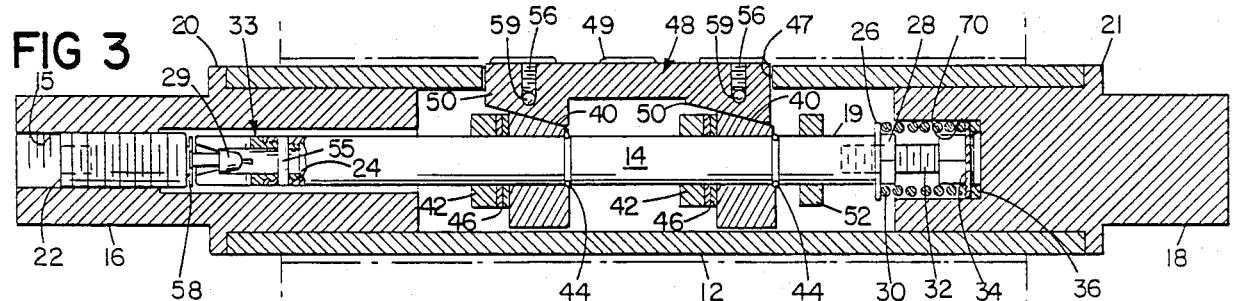
FIG 3
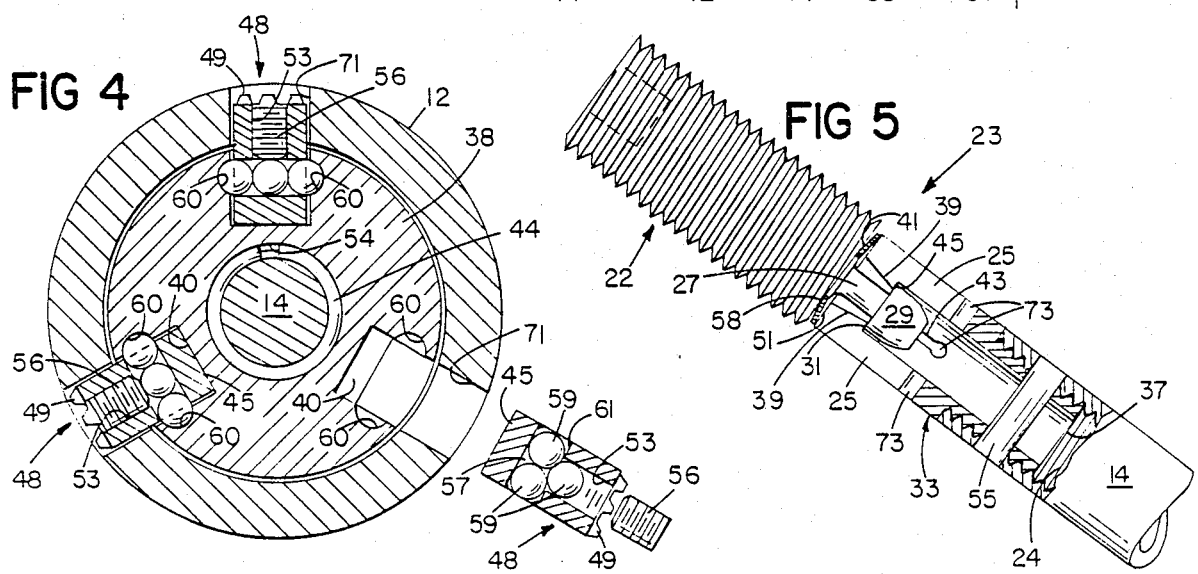
FIG 4
FIG 5

POSITIVE RETRACTING MECHANICAL EXPANSIBLE SHAFT

BACKGROUND OF THE INVENTION

This invention relates to expansible shafts.

Such shafts have an axially extending housing and a core engager which moves radially from a retracted position within the housing to an expanded position in which the core engager extends beyond the outer housing wall. For example, Peterson U.S. Pat. No. 4,254,920 (assigned to the assignee of this application) discloses a fluid-actuated shaft having an operating rod that is mounted co-axially with and moves axially relative to the housing. Springs move actuators to force the core engagers radially outwardly into engagement with a surrounding core and a fluid-activated piston drives the operating rod in the other direction to retract them. There are also shafts which use mechanical means (e.g., Acme screws) to expand actuators.

It is desirable that there be a positive, essentially fail-safe mechanism to retract the core-engagers. Springs and similar mechanisms can jam internally of the shaft, and also may not provide sufficient force if the core engagers have become embedded in the surrounding core.

CROSS-REFERENCE TO RELATED APPLICATIONS

The preferred embodiments described herein include several features which were invented prior to or generally concurrently with the present invention. Many of these features are the subject of other applications, co-pending with the present application, assigned to the assignee of the present application, and titled as follows:

MECHANICAL EXPANSIBLE SHAFT, Ser. No. 470,145 filed Feb. 28, 1983 in the name of Richard Edward Flagg;

EXPANSIBLE SHAFT WITH ACTUATOR RETAINING MEMBER AND SPHERICAL BEARING SURFACE, Ser. No. 470,142 filed Feb. 28, 1983 in the name of Virgil M. Pontes; and CORE-ENGAGER RETAINER FOR AN EXPANSIBLE SHAFT Ser. No. 485,111 filed Apr. 14, 1983 in the names of Virgil M. Pontes and Lawrence C. Young, the latter being the named inventor herein. The features which are the subject of the first two of the above-listed applications were made prior to the present invention.

SUMMARY OF THE INVENTION

The invention features, in a first aspect, an expansible shaft in which a screw that is rotationally and axially movable relative to the housing is rotatably connected to the operating rod so that clockwise screw rotation moves the rod axially in one direction and counter-clockwise screw rotation moves the rod axially in the opposite direction.

In preferred embodiments, the shaft has two springs, one biasing the rod axially in the direction tending to cause core-engager retraction, and the second biasing the screw axially away from the rod. The core-engager actuator comprises a first cam surface, inclined with respect to the axial rod, movement which drives a cam follower having a second cam surface in co-operative contact with the first surface; and the means for rotatably connecting the screw to the rod is a drive screw connected to a socket by a ball-and-socket joint.

The shaft is particularly advantageous in that both the engaging and disengaging force is supplied directly from the drive screw, thereby providing the shaft with a high gripping or engaging capacity and a positive means for disengaging the shaft. Moreover, the shaft has a relatively simple, lightweight design.

Other features and advantages of the invention will be apparent from the following description of the preferred embodiments and from the claims.

DESCRIPTION OF THE PREFERRED EMBODIMENTS

First, the drawings are briefly described.

Drawings

FIG. 1 is a perspective view, partially broken away, of a first expansible shaft showing the engaging sections retracted.

FIG. 2 is an enlargement of a portion of FIG. 1, with all core-engagers except one removed for clarity.

FIG. 3 is a lateral cross section of the shaft of FIG. 1 showing the core-engaging sections extended.

FIG. 4 is a cross section taken along 4—4 of FIG. 2.

FIG. 5 is a side view, partially broken away, of the rod actuator of FIG. 1.

Structure

Figure 6:
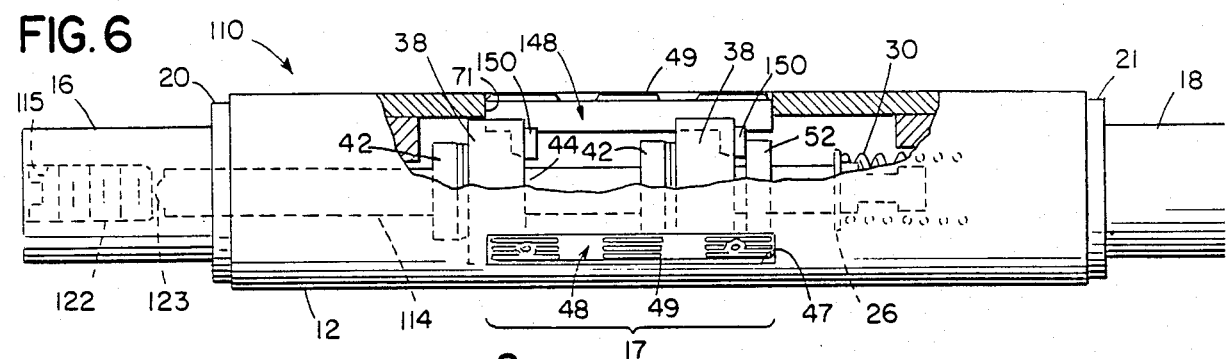
FIG. 6 is a perspective view, partially broken away, of a second shaft showing the core-engaging sections retracted.
Figure 7:
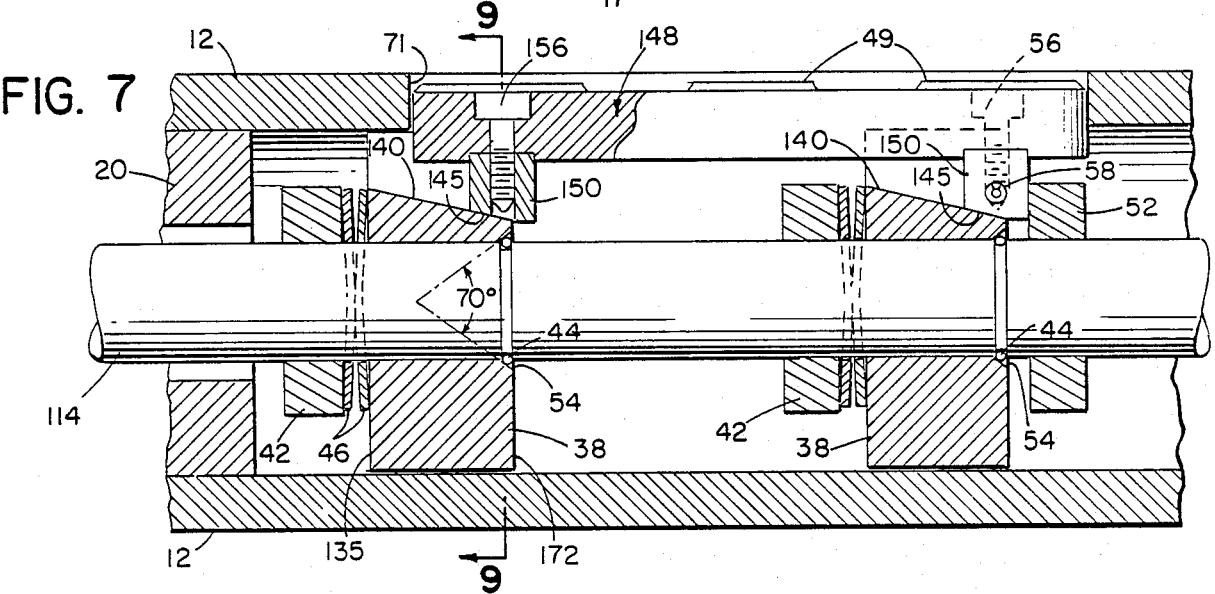
FIG. 7 is an enlargement of a portion of FIG. 6, with all core-engagers except one removed for clarity.
Figure 8:
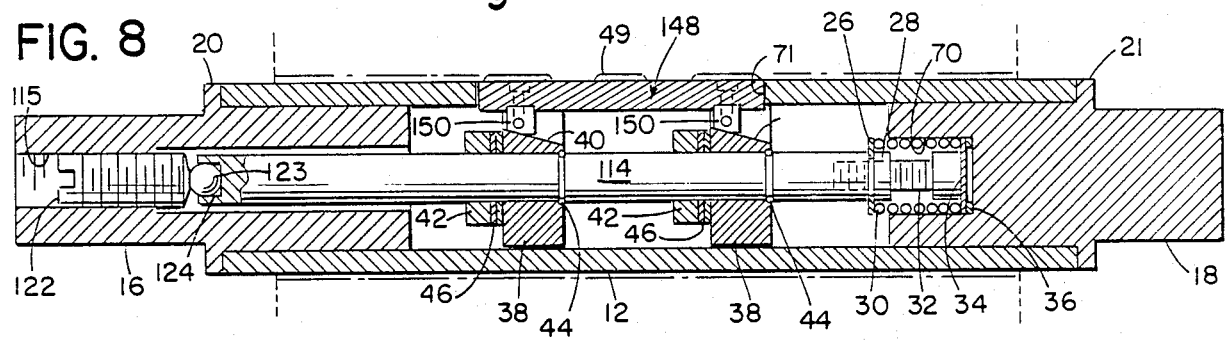
FIG. 8 is a lateral cross section of the shaft of FIG. 6 showing the core-engagers extended.

Referring now to FIGS. 1-5, expansible shaft 10 is formed from a hollow cylindrical outer housing 12, which is generally co-axial with, and surrounds, a central operating rod 14. Mounting arbors or journals (16 and 18) are fitted partially within the opposite ends of housing 12, and include respective impact collars 20, 21 which engage the opposite axially-facing ends of the housing. In the embodiment shown, shaft 10 includes one core engagement section 17, substantially centered along the length of the shaft.

A cylindrical bore 15 extends coaxially through journal 16. The outer (left as seen in FIG. 1) half of bore 15 is threaded and engages the outer, co-operatively threaded surface of drive screw 22 of rod-actuator 23. As best shown in FIG. 5, rod-actuator 23 comprises, in addition to drive screw 22, a socket 33 flexibly attached to screw 22 as described below.

A connecting shaft 27 protrudes coaxially from the axially inward end 51 of drive screw 22, and terminates at its inward end in a generally mushroom shaped head 29. The outer end of head 29 includes a flat annular surface 31 perpendicular to the axis of shaft 27 and facing towards screw 22. The diameter of connector shaft 27 is about 1/16 inches less than the maximum diameter of head 29; thus, the difference between the inner and outer diameters of surface 31 is 1/16 inch.

Socket 33 is a hollow cylinder, one end of which is threaded and engages operating rod 14 and the other end of which is snapped around connector shaft 27 and head 29. As shown, four slots 43 extend through the wall of socket 33 and extend axially from the outward end 41 of socket 33 to about midway its length, terminating in stress-relieving drilled holes 73. Slots 43 are equally spaced and provide four stiff fingers 25, each subtending an arc of about 90°. At the end of each finger 25 nearest end 41 is a radially inward projection 39, the inner surface of which is beveled outwardly toward end 41 and the axially inner end of which defines an annular step 45. Projections 39 of fingers 25 are sized so that the projections snap over head 29, providing clearance with the periphery of shaft 27 but with annular steps 45 engaging the sides and end 31 of head 29. When the socket 33 end screw 22 are so snapped together, the adjacent ends 51, 41 are closely adjacent, but not in contact with, each other. A belleville spring washer 58 is seated, in slight compression, in the gap between end 41 of socket 33 and the axially inward end 51 of the threaded section of drive screw 22, and biases the screw 22 and socket 33 axially apart. As will be evident, the screw and socket are free both to rotate, and slightly to pivot axially, with respect to each other.

In assembly, head 29 is axially forced past projections 39 of fingers 25. The outer surface of head 39 forces fingers 25 radially outward until head 29 clears the ends of projections 39, at which point the fingers snap into postion behind it.

As indicated, the axially inner end 37 of socket 33 is externally threaded and engages a co-operatively sized and threaded cylindrical cavity 24 in the end of rod 14. Once screw 22 and socket 33 have been snapped together, the entire actuator 23 is screwed into rod 14, a hole is drilled radially through the theaded together end 37 and rod 14, and a pin 55 is driven through the hole to hold everything tightly in place Operating rod 14 extends centrally from its end cavity 24 engaging socket 33, along the axis of housing 12 to a cylindrical recess 70 in the journal 18 at the far end of shaft 12. As shown, a travel adjusting cap screw 32 is threaded coaxially into the end 19 of rod 14 and is there held in place by jam nut 28. Jam nut 28 also holds stop washer 26 tightly in place against the rod end. A helical spring 30 is mounted within recess 70 and coaxially surrounds cap screw 32. One end of the spring engages a thrust washer 36 and belleville spring washer 34 (Associated Spring Co. Catalog No. 61125-053) at the base of cavity 70; the other end of the spring engages stop washer 26.

Each core engaging section 17 includes two axially-spaced spider cams 38, each of which is mounted coaxially on rod 14, and three circumferentially-spaced, axially-extending core engagers 48, each of which extends through a respective radially-extending opening 71 in the cylindrical wall of housing 12. The spider cams 38 are identical to each other, and each defines three circumferentially-spaced, inclined cam surfaces 40. In the illustrated embodiment, cam surfaces 40 are inclined at an angle (measured relative to the axis of rod 14 and, as shown in FIG. 2, inclined downwardly from the end 35 of the cam 38 nearer drive screw 22) of about 13°; and the cam surfaces, core engager 48, and openings 71 are all spaced at 120° intervals around the axis of the shaft.

Each spider cam 38 is mounted between a shaft collar 42 (at end 35 of the spider cam 38) and a retainer ring 44 (at the other end 72 of the cam). Two belleville spring washers 46 (Associated Spring Co. Catalog No. B1500-060) are mounted in series between and engaging collar 42 and cam end 35

As shown most clearly in FIG. 2, each core engager 48 is an integral metal unit that includes a number of spaced core engaging lugs 49 on its radially outer surface, and a pair of axially-spaced radially inwardly extending cam-followers 50, each of which defines a sloped cam surface 45 arranged to engage a respective cam surface 40 of a spider cam 38. A shaft collar button stop 52 is attached to rod 14 adjacent the end 72 of the spider cam 38 farther from drive unit 22. Stop 52 is positioned on rod 14 such that it will engage the axial end of a cam follower 50 and limit travel of rod 14 towards drive screw 22.

As shown in FIG. 2, a countersink (70° included angle) around the central opening of each spider cam 38 at its end 72 defines an annular surface 54 which is inclined radially outward (as shown at an angle of 35° relative to the axis of the shaft) toward retainer 44, and which contacts and is sufficiently deep entirely to receive and overlie retainer 44. Retainer 44 is a discontinuous ring 0.062 inches in diameter, seated in a groove 1/32 inch deep (i.e, about half the ring diameter) in rod 14.

Also shown in FIG. 4 is the structure which couples cam-followers 50 to spider cams 38. Each cam-follower 50 has a threaded central radial bore 53 about 0.210 inch in diameter, which joins at its radially inward portion to a cross-bore 57, also about 0.210 inch in diameter. Cross-bore 57 extends through cam follower 50, and its end openings 61 have been narrowed to about 1/16 inch diameter by peening over the ends of the cross-bore. Guide slots 60 are provided in spider cams 38, on each side of, parallel to, and slightly above each cam surface 40, aligned with cross-bore 57. Each cam follower 50 is about ½ inch wide; and each slot 60 is about 1/16 in. deep. As shown, cam followers 50 are held in place in spider cams 38 by three metal balls 59, each 0.208 in. in diameter. When the cam followers 30 are seated on cam surfaces 40, all three balls 59 will fit side-by-side in bores 57, with the outer portion of a ball fitted within each of guide slots 60. A screw 56, inserted in each bore 53, presses down on the centrally located ball and holds it in place in alignment with the two side balls 59. As will be seen, the distance of each of the two side balls 59 extends through a respective opening 61 into the respective guide slot 60 associated with that opening is less than the ball radius and, preferably is about ½ the ball radius.

In assembly, the balls are inserted into a bore 53, when the cam-followers 50 are at least partially in place. When the cam follower or cam surfaces 45 are fully seated on cam surfaces, screw 56 is tightened down on the center ball, insuring that the two side balls 59 extend into guide slots 60, thus anchoring the core follower member in place on the spider cam.

OTHER EMBODIMENTS

FIGS. 6-9 show an alternate shaft 110, essentially similar to that of FIGS. 1-5, but having a different method of coupling the actuating screw to the central rod and showing multi-piece core-engagment members. To the extent that elements in FIGS. 6-9 correspond to their counterparts in FIGS. 1-5, those elements have been given corresponding numbers.

As indicated above, this application describes features which are the subject of other applications. Specifically in FIG. 8, the ball 123 and socket 124 which constitute the site of contact between rod 144 and screw 122 are not part of an embodiment of the invention claimed by me in this application.

Figure 9:
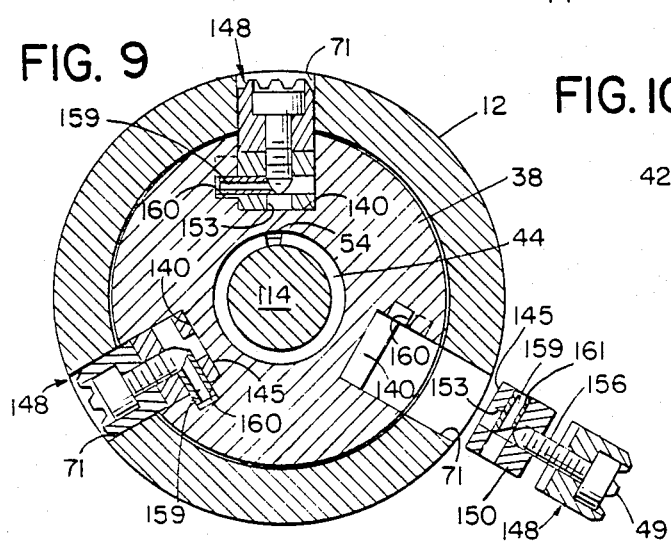
FIG. 9 is a cross section taken along 9—9 of FIG. 7.

The core-engagers of the FIGS. 6–9 embodiment is shown most clearly in FIG. 9. A pair of axially-spaced cam followers 150 are secured to the underside of each core engager 148, adjacent the opposite ends thereof. The inwardly-facing end of each cam follower 150 defines a sloped cam surface 145 arranged to engage a respective cam surface 140 of spider cam 138. Screws 156 are recessed in core engagers 148 and extend radially inwardly into threaded central bores 153 in cam followers 150. Each central bore 153 has a drilled lateral opening 161 which extends from the bore 153 to the exterior of the cam follower and accomodates a guide pin 159. A corresponding guide slot 160 is provided in each spider cam 138, parallel to, slightly above, and on one side of each of each cam surface 140. The guide pin 159 of each cam follower 150 fits within the guide slot 160 associated with the particular spider cam surface 140 that the cam follower cam surface 145 engages. Before assembly of core engagers 148 to cam followers 150, and of the cam followers to the spider cams 138, the outer end of each guide pin 159 is flush with the side of its cam followers 150, and the pin extends into the respective cam follower bore 153. Screws 156 have pointed ends, and, as the screws are tightened during assembly, they force the guide pins outwardly through the lateral openings 161 and into slots 160, thus anchoring the cam-follower/engaging-member assembly into the spider cam slots.

Figure 10:
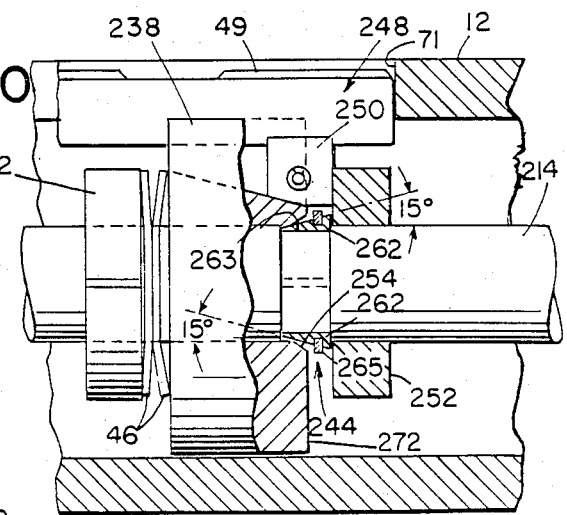
FIG. 10 is a cross section of a portion of a third shaft showing a conical core-enganging-actuator retaining member.

Finally, FIG. 10 shows a third shaft, similar in most respects to the shafts of FIGS. 1–9, but using a frusto-conical retaining collar 244 in place of retaining ring 44. Collar 244 comprises an annular ring, the outer surface of which is inclined at an angle of 15° to its axis, cut into two halves 262. Each collar half 262 is seated in a 1/32 inch deep groove 263 in rod 214, and the inner diameter of the ring from which halves 262 are cut is substantially equal to the outer diameter of the grooved portion 263 of the rod. The two halves are held in place by a Spirolox-brand spring ring 265 which surrounds them and is seated in a 1/32-inch deep groove in the outer surfaces of collar halves 262. As shown, the countersink at end 272 of the spider-cam-engaging collar 244 has an included angle of 30° (i.e., annular surface 254 is inclined at an angle of 15°) to mate smoothly with the collar. The depth of the countersink is such that it will receive and engage about half of collar 244.

Other embodiments will include a plurality of axially-spaced core engagement sections 17, the particular number of sections included in any particular shaft depending largely on the axial length of the core the shaft is intended to support. In shafts with multiple core engagement sections, adjacent sections may be aligned or they may be circumferentially staggered with respect to each other so that the shaft housing openings 71 of the adjacent sections are not axially aligned (e.g. are displaced 60° with respect to each other). Additionally, each spider cam (except the two end cams) may support the cam followers of the core engagers of two longitudinally adjacent core engagement sections, in which case the internal spider cams will each have six cam surfaces spaced 60° apart, and the core engagers of the two adjacent engagement sections will be coupled to alternate cam surfaces on a given spider cam.

Operation

FIG. 1 shows the shaft with core engagers 48 in the retracted position. Drive screw 22 is withdrawn (to the left as shown), and the rod 14 is biased towards the drive screw 22 by return spring 30. The extent to which rod 14 is free to move to the left is limited by stop 52, which, as shown in FIG. 2, abuts the side of a cam follower 50 preventing further rod movement. In the fully-retracted position, the cam engagers 48 are at their radially inner-most position, with lugs 49 flush with or slightly within the cylindrical outer surface of housing 12, and the cam follower cam surfaces 45 engage the lower (radially inner) ends of spider cam surfaces 40. Retainer rings 44 couple cams 38 to rod 14, ensuring movement of the cams as the rod is moved. The distance between stop 52 and the retainer ring 44 of the adjacent cam 38 is less than the axial length of cam followers 50, thereby preventing the cam followers from sliding off cam surfaces 40.

To extend core engagers 48 past the perimeter of housing 12 so that they will engage the core of a roll placed on the shaft, drive screw 22 is tightened (i.e., rotated clockwise, moving it and rod 14 to the right as shown in the figures. Such movement forces spider cams 38 to the right, driving cam followers 50 up spider cam surfaces 40 and in turn forcing core engagers 48 radially outward to the extended position shown in FIG. 3. The total travel of cams 38 is about ¾ inch. In practice, the amount of expansion obtained will depend on the diameter of the surrounding core and the amount of force applied to drive unit 22. Maximum possible expansion is achieved when return spring 30 has been fully compressed and cap screw 32 has flattened belleville washer 34 against thrust washer 36.

To retract core engagers 48 and release the core, drive unit 22 is rotated counterclockwise and moves the rod to the left as shown in the figures, reversing the above-described operation. Ordinarily, return spring 30 aids the leftward rod movement, but even if spring 30 fails, and mechanical interference of some sort hinders the movement of the rod, drive screw 22 is mechanically attached to rod 14, and itself provides the necessary positive return (i.e., leftward in the Figs.) force.

When core engagers 48 tightened into engagement with a surrounding core, three sets of springs continuously load drive screw 22 (biasing it to the left as shown) and help insure that vibrations and the like will be damped out and that the drive screw will not loosen and retract; belleville washer 58 forces drive screw 22 axially away from socket 33; belleville washers 46 force shaft collar 42 (and hence rod 14) leftward; and a leftward force also is provided by spring 30. In addition to damping vibration and loading device screw 22, washer 58 takes up play in the joint between screw 22 and a socket 33.

Various other features of the shaft provide for efficient operation under relatively harsh operation conditions, such as the rapid rotation of the shaft when it is under a heavy load which may cause considerable flexing. Specifically, the direct coupling between drive screw 22, rod 14, and engagers 48 transmits significant force to the engagers and provides a high load-carrying capacity. Further, the use of belleville washers to between collars 42 and their respective spider cams 38 permits slight variations in axial displacement of the two cams 38 of a core engagement section 17, thereby permitting one end of a core engagement member 48 of an engagement section to expand slightly farther than the other so that the member 48 will conform to the core of the roll being supported even though that core may be slightly irregular or the shaft bowed.

Similarly, the combination of both return spring 30 and a belleville washer 34 permits a person tightening the shaft to "feel" the increased resistance of the latter as full expansion is approached.

What is claimed is:

1. An expansible shaft for engaging and rotating the core of a roll comprising:

an axially-extending housing;

an operating rod mounted coaxially of said housing and arranged for movement axially relative to said housing;

a core engager movable radially relative to said housing and said operating rod between an expanded position in which said core engager extends beyond the outer wall of said housing and a retracted position in which said core engager is positioned radially within said expanded position thereof;

an actuator mounted on said rod and arranged to move axially in response to axial movement of said rod, said actuator axial movement causing said core engager to move towards said expanded position in response to axial movement of said rod;

an actuating screw threadingly engaging said housing and being rotationally and axially movable relative to said housing, said screw being mounted coaxially of and in general axial alignment with said rod; and, means for connecting said screw to said rod to permit relative rotation of said screw and rod and to move said rod axially in one axial direction in response to clockwise rotation of said actuating screw and in the opposite axial direction in response to counterclockwise rotation of said actuating screw, said rotatable connecting means comprising a first pair of generally oppositely axialy facing surfaces and a second pair of generally oppositely axially facing surfaces axially spaced from said first pair of surfaces, the surfaces of said first pair of surfaces being attached to one of said rod and said screw, the surfaces of said second pair of surfaces being attached to the other of said rod and said screw, said surfaces of said first pair being positioned axially between said surfaces of said second pair whereby screw movement in one axial direction causes one surface of said first pair to contact one surface of said second pair and push said rod in said one direction and screw movement in the opposite axial direction causes the other surface of said first pair to contact the other surface of said second pair and push said rod in said other direction, said one surface of said first pair of surfaces comprising a segment of a ball surface facing in one generally axial direction, said ball being attached to one of said rod and said screw, and said one surface of said second pair of surfaces comprising a segment of the inner surface of a socket that generally envelopes said ball and is attached to the other of said rod and said screw.

2. The shaft of claim 1 further comprising a spring mounted within said shaft and arranged to exert axially directed force on said rod.

3. The shaft of claim 2 further characterized in that said spring biases said screw axially in an opposite direction to that which said screw moves to secure said core-engager toward said expanded position.

4. The shaft of claim 2 further characterized in that said spring biases said rod in a direction opposite to that which said rod moves to secure said core-engager towards said expanded positon.

5. The shaft of claim 2 further characterized in that said spring is positioned to apply axial force to the end of said rod opposite said screw.

6. The shaft of claim 5 further comprising a second spring positioned axially between said screw and said first rod end, said second spring tending to force said screw axially away from said rod.

7. An expansible shaft comprising:

an axially-extending housing;

an operating rod mounted coaxially of said housing and arranged for movement axially relative to said housing;

a core engage movable radially relative to said housing and said operating rod between an expanded position in which said core engager extends beyond the outer wall of said housing and a retracted position in which said core engager is positioned radially within said expanded position thereof;

an actuator mounted on said rod and arranged to move axially in response to axial movement of said rod, said actuator axial movement causing said core engager to move towards said expanded position in response to axial movement of said rod;

an actuating screw threadingly engaging said housing and being rotationally and axially movable relative to said housing, said screw being mounted coaxially of and in general axial alignment with said rod; and a means for connecting said screw to said rod to permit relative rotation of said screw and rod and to move said rod axially in one axial direction in response to clockwise rotation of said actuating screw and in the opposite axial direction in response to counterclockwise rotation of said actuating screw, said connecting means comprising a ball member fixed to one of said screw and said rod, and a socket member connected to the other of said screw and said rod, said socket member defining a cavity sized to receive and allow rotation of said ball therein, and further defining an entrance passage thereto configured and sized to prevent passage of said ball therethrough during operation of said shaft.

8. The shaft of claim 7 further characterized in that said ball member is fixed to said screw and said socket member is fixed to said rod.

9. The shaft of claim 8 further characterized in that said ball member comprises a connector shaft attached at one end to said screw and at the other end to a generally mushroom-shaped head having at its base an annular surface perpendicular to the axis of said shaft and facing towards said screw, and said socket member includes a generally cylindrical bore having a plurality of circumferentially-spaced slots through the wall thereof extending from one end thereof, the portion of said bore nearer said end having a diameter less than that of said head and having an interior annular step arranged to engage said surface of said head, and an interior portion of said bore having a diameter not less than and being arranged to receive said head.

10. The shaft of claim 9 wherein said slots define a plurality of axially-extending fingers, and the ends of said fingers at said end of said socket member are movable radially to permit said head to be inserted axially into said interior portion of said bore.

11. The shaft of claim 9 further characterized in that a spring surrounds said shaft and engages the adjacent ends of said screw and said socket member and biases them axially apart.

12. The shaft of claim 7 wherein said connecting means comprises a spring member mounted to bias said ball member and said socket member axially apart.

* * * * *